(12) United States Patent
Liu (10) Patent No.: US 11,336,760 B2
(45) Date of Patent: May 17, 2022

(54) METHOD, DEVICE FOR CONTROLLING RETRACTABLE CAMERA, AND STORAGE MEDIUM (71) Applicant: Beijing Xiaomi Mobile Software Co., Ltd., Beijing (CN)

(72) Inventor: Teng Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/005,718

(22) Filed: Aug. 28, 2020

(65) Prior Publication Data
US 2021/0329109 A1    Oct. 21, 2021

(30) Foreign Application Priority Data
Apr. 16, 2020  (CN) .......................... 202010298761.5

(51) Int. Cl.
*H04N 5/225* (2006.01)
*H04N 5/232* (2006.01)
*H04M 1/02* (2006.01)

(52) U.S. Cl.
CPC ........ *H04M 1/0264* (2013.01); *H04N 5/2257* (2013.01); *H04N 5/225251* (2018.08); *H04M 2250/52* (2013.01)

(58) Field of Classification Search
CPC ............... H04N 5/2257; H04N 5/2258; H04N 5/232941; H04M 1/0264
(Continued)

(56) References Cited

U.S. PATENT DOCUMENTS

2018/0091716 A1* 3/2018 Brand .................. H04N 5/2254
2018/0232014 A1* 8/2018 Zhu ........................ G06F 1/1686
(Continued)

FOREIGN PATENT DOCUMENTS

CN    108390964 A    8/2018
CN    108833697 A    11/2018
(Continued)

OTHER PUBLICATIONS

Extended European Search Report dated Mar. 17, 2021 in European Patent Application No. 20198763.3, 14 pages.
(Continued)

*Primary Examiner* — Anthony J Daniels
(74) *Attorney, Agent, or Firm* — Oblon, McClelland, Maier & Neustadt, L.L.P.

(57) ABSTRACT

The present disclosure relates to a method, device, and storage medium for controlling a retractable camera. The method can include receiving an instruction for ejecting the retractable camera, detecting whether the mobile terminal meets a condition indicating that the camera has a risk of damage when being ejected, and disabling the instruction for ejecting the retractable camera when the mobile terminal meets the condition indicating that the camera has a risk of damage when being ejected. In the present disclosure, after the instruction for ejecting the retractable camera is received, the retractable camera is not ejected immediately. On the contrary, the mobile terminal is first determined whether meets the condition indicating that the camera has a risk of damage when being ejected. When the mobile terminal meets the condition indicating that the camera has a risk of damage when being ejected, the instruction for ejecting the camera is disabled.

16 Claims, 4 Drawing Sheets

(58) Field of Classification Search
USPC .......................................................... 348/373
See application file for complete search history.

(56) References Cited

U.S. PATENT DOCUMENTS

2019/0373141 A1* 12/2019 Xu ..................... H04N 5/23216
2021/0175920 A1*  6/2021 Park .................... H04M 1/0264

FOREIGN PATENT DOCUMENTS

| CN | 108924299 A | 11/2018 |
| CN | 109089023 A | 12/2018 |
| CN | 110196616 A | 9/2019 |
| CN | 110418000 A | 11/2019 |
| CN | 110445914 A | 11/2019 |
| KR | 10-2015-0069740 A | 6/2015 |

OTHER PUBLICATIONS

Combined Office Action and Search Report dated Mar. 31, 2022, in Chinese Patent Application No. 202010298761.5.

* cited by examiner

METHOD, DEVICE FOR CONTROLLING RETRACTABLE CAMERA, AND STORAGE MEDIUM

RELATED APPLICATION

The present application is based on and claims the priority to the Chinese Patent Application No. 202010298761.5, filed on Apr. 16, 2020, the entire contents of which are hereby incorporated by reference.

TECHNICAL FIELD

The present disclosure relates to mobile terminal data processing technologies, including to a method, device for controlling a retractable camera, and storage medium.

BACKGROUND

In order to meet needs of different users, some mobile terminals have a fixed camera, some mobile terminals have a retractable camera, and some mobile terminals have both the fixed camera and the retractable camera. During the operation of the mobile terminal, after receiving an instruction for ejecting the camera, the mobile terminal ejects the retractable camera, and after receiving an instruction for retracting the camera, the mobile terminal retracts the retractable camera. When a position where the retractable camera is ejected is blocked, the camera may be damaged if the mobile terminal directly ejects the camera after receiving the instruction for ejecting the camera.

SUMMARY

The present disclosure provides a method and device for controlling a retractable camera, and a storage medium.

According to a first aspect of the present disclosure, there is provided a method for controlling a retractable camera that can be applied to a mobile terminal. The method can include receiving an instruction for ejecting the retractable camera, detecting whether the mobile terminal meets a condition indicating that the camera has a risk of damage when being ejected, and disabling the instruction for ejecting the retractable camera when the mobile terminal meets the condition indicating that the camera has a risk of damage when being ejected.

In an embodiment, the mobile terminal meeting a condition indicating that the camera has a risk of damage when being ejected can include at least one of the following: a motion characteristic speed collected by an inertial sensor in the mobile terminal is greater than or equal to a set speed value; a light intensity value collected by a light sensor in the mobile terminal is less than or equal to a set light intensity value; a set type of device is connected to the mobile terminal through a set short-range wireless communication mode, during operation of the device, the device is clamped to the mobile terminal at a position so that the retractable camera is blocked to be ejected; and a magnetic field intensity value between the mobile terminal and a magnet on the set type of device collected by a magnetic field sensor of the mobile terminal is greater than or equal to a set magnetic field intensity value, where a position where the magnetic field sensor is disposed in the mobile terminal is on a same side as a position where the camera is disposed in the mobile terminal.

In an embodiment, the method can further include, after disabling the instruction for ejecting the camera, detecting whether the mobile terminal meets the condition indicating that the camera has a risk of damage when being ejected, executing the instruction for ejecting the camera when the mobile terminal does not meet the condition indicating that the camera has a risk of damage when being ejected.

In an embodiment, the method further can include, after disabling the instruction for ejecting the camera, detecting whether the mobile terminal meets the condition indicating that the camera has a risk of damage when being ejected. When the mobile terminal does not meet the condition indicating that the camera has a risk of damage when being ejected, displaying a confirmation control for confirming to execute the instruction for ejecting the camera, and after receiving a confirmation signal for the confirmation control, executing the instruction for ejecting the camera.

In an embodiment, the step of disabling the instruction for ejecting the camera when the mobile terminal meets the condition indicating that the camera has a risk of damage when being ejected can include displaying a first selection control and a second selection control when the mobile terminal meets the condition indicating that the camera has a risk of damage when being ejected. The first selection control can be used for disabling the instruction for ejecting the camera, and the second selection control can be used for allowing to execute the instruction for ejecting the camera. After receiving a touch click signal for the first selection control, the step can include disabling the instruction for ejecting the camera.

According to a second aspect of the present disclosure, there is provided a device for controlling a retractable camera that is applied to a mobile terminal. The device can include a first receiving module that is configured to receive an instruction for ejecting the retractable camera. The device can further include a first detection module that is configured to detect whether the mobile terminal meets a condition indicating that the camera has a risk of damage when being ejected, and a first control module that is configured to disable the instruction for ejecting the retractable camera when the mobile terminal meets the condition indicating that the camera has a risk of damage when being ejected.

In an embodiment, the mobile terminal meeting a condition indicating that the camera has a risk of damage when being ejected includes at least one of the following: a motion characteristic speed collected by an inertial sensor in the mobile terminal is greater than or equal to a set speed value; a light intensity value collected by a light sensor in the mobile terminal is less than or equal to a set light intensity value; a set type of device is connected to the mobile terminal through a set short-range wireless communication mode, during operation of the device, the device is clamped to the mobile terminal at a position so that the retractable camera is blocked to be ejected; and a magnetic field intensity value between the mobile terminal and a magnet on the set type of device collected by a magnetic field sensor of the mobile terminal is greater than or equal to a set magnetic field intensity value, where a position where the magnetic field sensor is disposed in the mobile terminal is on a same side as a position where the camera is disposed in the mobile terminal.

The device can further include a second detection module that is configured to detect whether the mobile terminal meets the condition indicating that the camera has a risk of damage when being ejected after disabling the instruction for ejecting the camera, and a second control module that is configured to execute the instruction for ejecting the camera when the mobile terminal does not meet the condition indicating that the camera has a risk of damage when being ejected.

In another embodiment, the device further include a second detection module that is configured to detect whether the mobile terminal meets the condition indicating that the camera has a risk of damage when being ejected after disabling the instruction for ejecting the camera, and a first display module that is configured to display a confirmation control for confirming the execution of the instruction for ejecting the camera when the mobile terminal does not meet the condition indicating that the camera has a risk of damage when being ejected. Additionally, the device can include a first receiving module that is configured to receive a confirmation signal for the confirmation control, and a third control module that is configured to execute the instruction for ejecting the camera.

The first control module include a second display module that is configured to display a first selection control and a second selection control when the mobile terminal meets the condition indicating that the camera has a risk of damage when being ejected, where the first selection control is used for disabling the instruction for ejecting the camera, and the second selection control is used for allowing to execute the instruction for ejecting the camera. The first control unit can further include a second receiving module that is configured to receive a touch click signal for the first selection control, and a fourth control module that is configured to disable the instruction for ejecting the camera.

According to a third aspect of the present disclosure, there is provided a device for controlling a retractable camera. The device can include a processor and a memory for storing executable instructions for the processor. The processor is configured to execute the executable instructions in the memory to implement the steps of the method described above.

According to a fourth aspect of the present disclosure, there is provided a non-transitory computer-readable storage medium having executable instructions stored thereon that, when executed by a processor, cause the processor to implement the steps of the method described above.

Technical solutions provided by the embodiments of the present disclosure may include beneficial effects. For example, after the instruction for ejecting the retractable camera is received, the retractable camera is not ejected immediately. On the contrary, the mobile terminal is first determined whether it meets the condition indicating that the camera has a risk of damage when being ejected. When the mobile terminal meets the condition indicating that the camera has a risk of damage when being ejected, the instruction for ejecting the camera is disabled, so that the retractable camera maintains in a retracted state, to avoid damage to the retractable camera due to ejecting, thereby effectively protecting the retractable camera and extending service life of the retractable camera.

It should be noted that the above general description and the following detailed description are merely exemplary and explanatory and should not be construed as limitation of the disclosure.

BRIEF DESCRIPTION OF THE DRAWINGS

The accompanying drawings, which are incorporated in the specification and constitute a part of the specification, show exemplary embodiments of the present disclosure. The drawings along with the specification explain the principles of the present disclosure.

DETAILED DESCRIPTION

Exemplary embodiments will be described in detail herein, examples of which are illustrated in the accompanying drawings. In the following description, the same referential number used in the different figures refers to the same or similar elements unless otherwise indicated. The embodiments described in the following exemplary embodiments do not represent all embodiments consistent with the present disclosure. Instead, they are merely examples of devices and methods consistent with aspects of the present disclosure as detailed in the appended claims.

Figure 1:
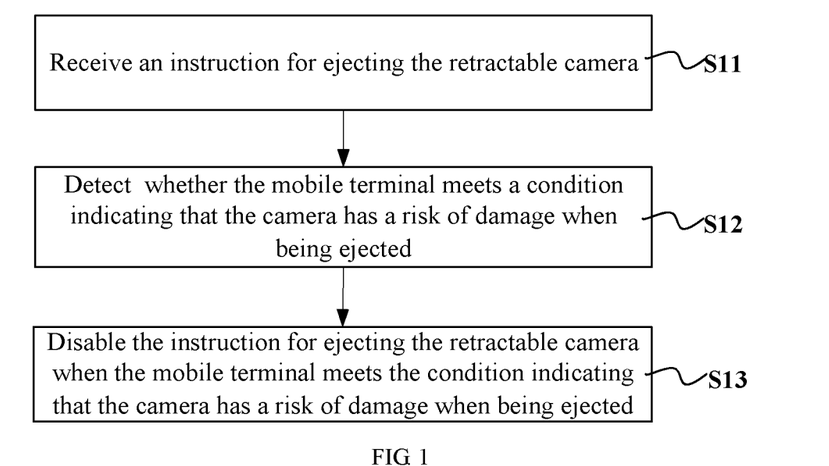
FIG. 1 is a flowchart showing a method for controlling a retractable camera according to an exemplary embodiment.

Embodiments of the present disclosure provide a method for controlling a retractable camera. Referring to FIG. 1 which is a flowchart showing a method for controlling a retractable camera according to an exemplary embodiment, as shown in FIG. 1, the method includes steps described below.

In step S11, an instruction for ejecting the retractable camera is received.

In step S12, it is detected whether the mobile terminal meets a condition indicating that the camera has a risk of damage when being ejected.

In step S13, when the mobile terminal meets the condition indicating that the camera has a risk of damage when being ejected, the instruction for ejecting the retractable camera is disabled.

The received instruction for ejecting the retractable camera is included in instructions for enabling camera-related functions in an application of the mobile terminal, or the received instruction for ejecting the retractable camera is an instruction for enabling the camera-related functions in the application of the mobile terminal. For example, the instruction for enabling the camera-related functions is an instruction for enabling a video call in a network instant messaging application, and the instruction for enabling a video call includes an instruction for calling the retractable camera. If it is determined that the retractable camera is a retracted state after the instruction for calling the retractable camera is received, it is considered that the instruction for ejecting the retractable camera is received.

In this embodiment, after the instruction for ejecting the retractable camera is received, the retractable camera is not ejected immediately. On the contrary, it is first determined whether the mobile terminal meets the condition indicating that the camera has a risk of damage when being ejected. When the mobile terminal meets the condition indicating that the camera has a risk of damage when being ejected, the instruction for ejecting the camera is disabled, so that the retractable camera maintains in a retracted state to avoid damage to the retractable camera due to ejecting, thereby effectively protecting the retractable camera and extending service life of the retractable camera.

The embodiments of the present disclosure further provide a method for controlling a retractable camera. The method includes the method shown in FIG. 1, and the mobile terminal met the condition indicating that the camera has a risk of damage when being ejected in at least one of the following situations First, a motion characteristic speed collected by an inertial sensor in the mobile terminal is greater than or equal to a set speed value. The motion characteristic speed includes angular velocity and/or acceleration. Through this condition, when the mobile terminal is in vigorous motion, it is prohibited to eject the retractable camera, thereby preventing the ejected retractable camera from being damaged due to accident drop of the mobile terminal.

Second, a light intensity value collected by a light sensor in the mobile terminal is less than or equal to a set light intensity value. Through this condition, when the mobile terminal is placed in the user's pocket or bag, it is prohibited to eject the retractable camera, thereby preventing damage to the retractable camera caused in a case where the retractable camera is ejected the pocket or bag and collides with other hard objects.

Third, a set type of device is connected to the mobile terminal through a set short-range wireless communication mode, during operation, the device is clamped to the mobile terminal at a position corresponding to the retractable camera so that the retractable camera is prevented from being ejected. The set short-range wireless communication mode is wireless communication within 10 meters such as Bluetooth and ZigBee. The set type of device is a preset type. For example, the device is a gamepad, a speaker, a sensor, and the like. Through this condition, when the mobile terminal is connected to the set type of device for use, it is possible to prevent damage to the retractable camera caused by the set type of device that is clamped at the position where the retractable camera is ejected.

Fourth, a magnetic field intensity value between the mobile terminal and a magnet on a set type of device, which is collected by a magnetic field sensor of the mobile terminal, is greater than or equal to a set magnetic field intensity value, where a position where the magnetic field sensor is disposed in the mobile terminal is on a same side as a position where the camera is disposed in the mobile terminal. For example, the camera is arranged on a top of the mobile terminal, the magnetic field sensor is also arranged on the top of the mobile terminal, or the magnetic field sensor is arranged on the top of the camera.

The magnetic field sensor is a Hall sensor, and the set type of device is provided with the magnet. The magnetic field intensity value between the mobile terminal and the set type of device refers to the magnetic field strength value between the Hall sensor and the magnet. When the magnetic field strength value is greater than or equal to the set magnetic field strength value, it indicates that the physical connection between the mobile terminal and the set type of device is not disconnected, and when the magnetic field strength value is less than the set magnetic field strength value, it indicates the physical connection between the mobile terminal and the set type of device is disconnected.

Through this condition, it is determined whether the mobile terminal and the magnetic field sensor are clamped according to the magnetic field strength value between the magnetic field sensor and the magnet on the set type of device, thereby preventing damage to the retractable camera caused by ejecting the retractable camera when the mobile terminal and the magnetic field sensor are clamped.

In an optional implementation of the present disclosure, when it is detected that there is an obstacle within a preset distance from the mobile terminal in a ejecting direction the camera, and the preset distance is less than a length of the camera to be ejected, in other words, when the camera will be blocked if it is ejected normally and damage may be caused to the camera if it is ejected directly, the camera is prohibited from ejecting. Infrared detection, radar wave detection may be used to detect whether the obstacle is within a preset distance, or the detection may be performed by detecting whether there is a connected external accessory described above. When more than one of the above conditions is used simultaneously, the protection for the camera can be increased.

Figure 2:
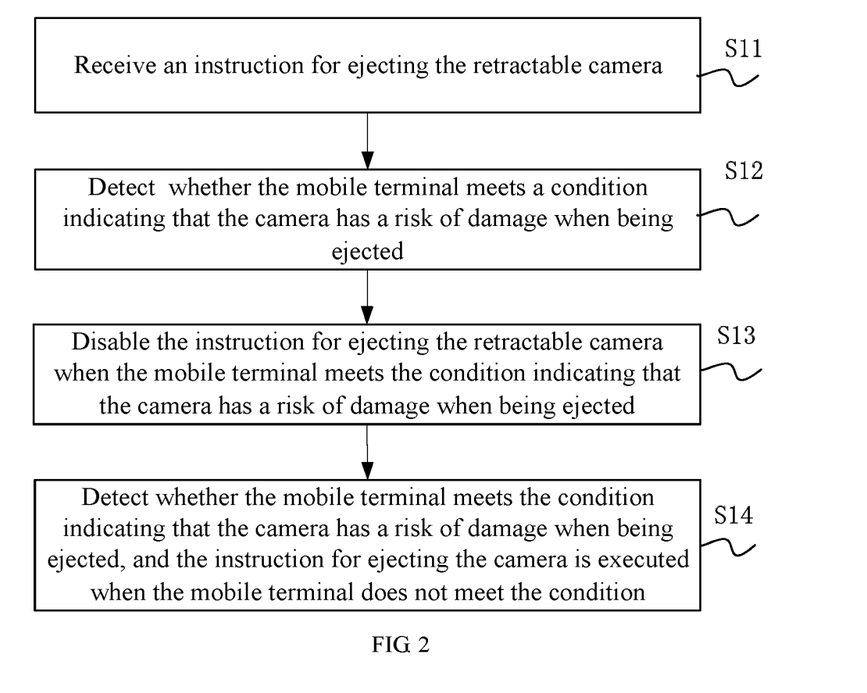
FIG. 2 is a flowchart showing a method for controlling a retractable camera according to an exemplary embodiment.
Figure 3:
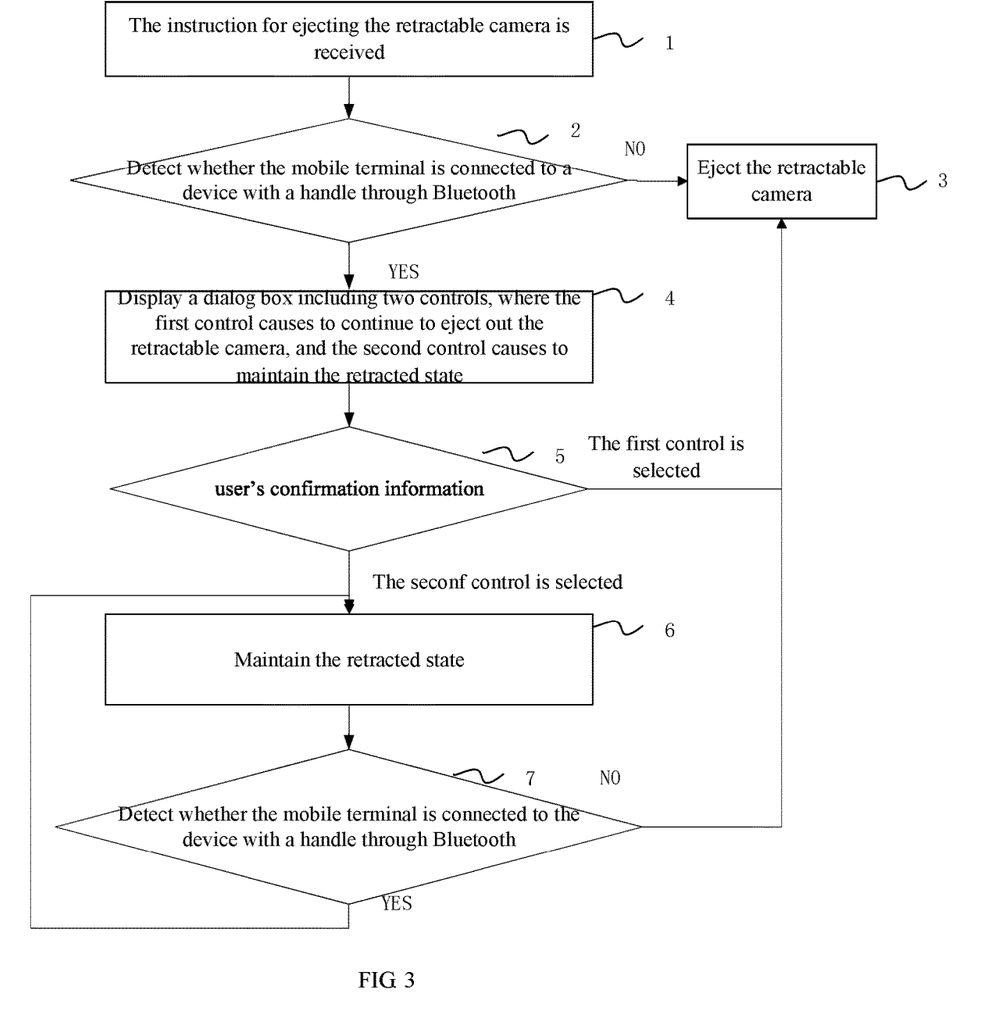
FIG. 3 is a flowchart showing a method for controlling a retractable camera according to a specific embodiment.

The embodiments of the present disclosure further provide a method for controlling a retractable camera. Referring to FIG. 2 which is a flowchart showing a method for controlling a retractable camera according to an exemplary embodiment. In addition to the method shown in FIG. 1, the method further includes steps described below.

In step S14, it is detected whether the mobile terminal meets the condition indicating that the camera has a risk of damage when being ejected, and the instruction for ejecting the camera is executed when the mobile terminal does not meet the condition indicating that the camera has a risk of damage when being ejected. In another embodiment, in step S14, when the mobile terminal meets the condition indicating that the camera has a risk of damage when being ejected, the instruction for ejecting the camera is continued to be disabled.

The detection process in step S14 is performed one or more times. For example, after a first set period elapses since step S13 is completed, the detection process in step S14 is performed. Or, after a set period elapses since step S13 is completed, the detection process in step S14 is periodically performed at an interval of a second set period. Alternatively, within a third set period after step S13 is completed, the detection process in step S14 is periodically executed at an interval of a fourth set period.

In this embodiment, after the instruction for ejecting the camera is disabled, it is continued to detect whether the mobile terminal meets the condition indicating that the camera has a risk of damage when being ejected. When the condition is not met, it is confirmed that there is no risk of damage caused by ejecting the camera, and the instruction for ejecting the retractable camera is executed, so that a user can use the camera to complete a corresponding camera function.

The embodiments of the present disclosure further provide a method for controlling a retractable camera. In addition to the method shown in FIG. 1, the method can further include, after the instruction for ejecting the camera is disabled, detecting whether the mobile terminal meets the condition indicating that the camera has a risk of damage when being ejected, in response to determining that the mobile terminal does not meet the condition indicating that the camera has a risk of damage when being ejected, displaying a confirmation control for confirming the execution of the instruction for ejecting the camera, and after receiving a confirmation signal for the confirmation control, executing the instruction for ejecting the camera.

In this embodiment, after the instruction for ejecting the camera is disabled, when the mobile terminal does not meet the condition indicating that the camera has a risk of damage when being ejected, that is, the risk of damage caused by ejecting the camera is removed, it is required confirmation from the user according to the actual use conditions. After the mobile terminal receives the user's confirmation signal, it executes the instruction for ejecting the camera. By adding the user's confirmation part, the security of the camera is further ensured.

The embodiments of the present disclosure further provide a method for controlling a retractable camera. The method includes the method shown in FIG. 1, and step S13 includes displaying a first selection control and a second selection control when the mobile terminal meets the condition indicating that the camera has a risk of damage when being ejected, where the first selection control is used for disabling the instruction for ejecting the camera, and the second selection control is used for allowing to execute the instruction for ejecting the camera. After a touch click signal for the first selection control is received, the instruction for ejecting the camera is disabled.

The method further can include after receiving a touch click signal for the second selection control, the instruction for ejecting the camera is allowed to be executed. In this embodiment, when it is determined whether the mobile terminal meets the condition indicating that the camera has a risk of damage when being ejected, the user's confirmation part is added, and the camera is controlled to be ejected or remain being retracted according to the user's instructions to ensure the security of the camera.

The following is a description by specific embodiments.

Specific Embodiment 1

The top of the mobile terminal is provided with a retractable camera. The mobile terminal can establish a Bluetooth connection with a gamepad, and the two are used in combination after the gamepad is clamped to the mobile terminal. After the gamepad is clamped to the mobile terminal, one side of the gamepad abuts against the top of the mobile terminal, thereby blocking the ejecting of the retractable camera.

In step 1, an instant network communication application is running in the mobile terminal, and a video call request is received through the instant network communication application, in response to the video call request, the mobile terminal determines that the instruction for ejecting the retractable camera is received.

In step 2, it is detected whether the mobile terminal is connected to a device with a handle in the Bluetooth mode. When the detection result is false, step 3 is executed to eject the retractable camera, and the process ends. When the detection result is true, step 4 is executed to display a dialog box including two controls, where the first control, when selected by the user, causes to continue to eject the retractable camera, and the second control, when selected by the user, causes the retractable camera to maintain the retracted state.

In step 5, user's confirmation information is received, and when the user selects the first control, step 3 is performed. When the user selects the second control, step 6 is performed to maintain the retracted state.

In step 7, after a set period, it is detected whether the mobile terminal continues to be connected to the device with a handle through the Bluetooth mode. If so, the process proceeds to step 6. Otherwise, the process proceeds to step 3.

Specific Embodiment 2

The specific embodiment 2 includes steps 1 to 8, and step 1 to step 6 are the same as step 1 to step 6 in specific embodiment one. In step 7 of the embodiment 2, after the set period elapses, it is detected whether the mobile terminal continues to be connected to the device with a handle through the Bluetooth mode. If so, the process proceeds to step 6. Otherwise, the process proceeds to step 8.

In step 8, it is detected whether the instruction for ejecting the retractable camera is still valid. If yes, the process proceeds to step 3. Otherwise, the process proceeds to step 6.

Specific Embodiment 3

The specific embodiment 3 includes steps 1 to 8, and step 1 to step 6 are the same as step 1 to step 6 in the specific embodiment one. In step 7 of the embodiment 3, after the set period elapses, if the instruction for ejecting the retractable camera is still valid, it is detected whether the mobile terminal continues to be connected to the device with a handle through the Bluetooth mode. If yes, the process proceeds to step 3. Otherwise, the process proceeds to step 6.

Figure 4:
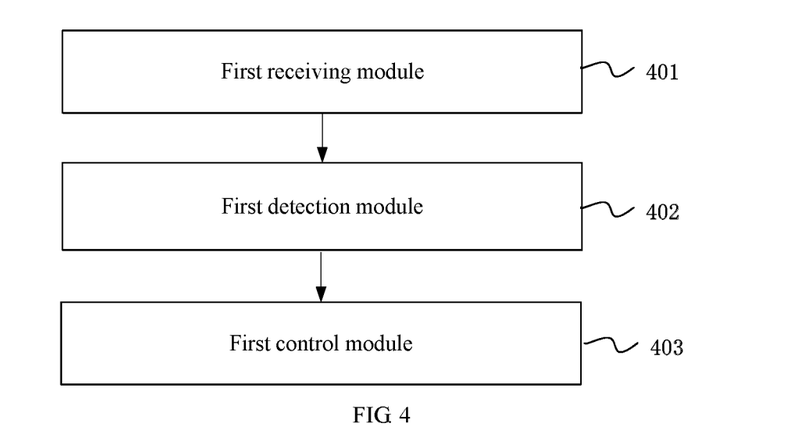
FIG. 4 is a structural diagram showing a device for controlling a retractable camera according to an exemplary embodiment.

Embodiments of the present disclosure provide a device for controlling a retractable camera. Referring to FIG. 4 which is a structural diagram showing a device for controlling a retractable camera according to an exemplary embodiment. As shown in FIG. 4, the device includes a first receiving module 401, a first detection module 402 and a first control module 403. Of course, it should be understood that one or more of the modules described in this disclosure can be implemented by processing circuitry.

The first receiving module 401 is configured to receive an instruction for ejecting the retractable camera. The first detection module 402 is configured to detect whether the mobile terminal meets a condition indicating that the camera has a risk of damage when being ejected. The first control module 403 is configured to disable the instruction for ejecting the retractable camera when the mobile terminal meets the condition indicating that the camera has a risk of damage when being ejected.

In another embodiment, the mobile terminal is detected as meeting the condition indicating that the camera has a risk of damage when being ejected in at least one of the following: a motion characteristic speed collected by an inertial sensor in the mobile terminal is greater than or equal to a set speed value; a light intensity value collected by a light sensor in the mobile terminal is less than or equal to a set light intensity value; a set type of device is connected to the mobile terminal through a set short-range wireless communication mode, during operation, the device is clamped to the mobile terminal at a position corresponding to the retractable camera so that the retractable camera is prevented from being ejected; and a magnetic field intensity value between the mobile terminal and a magnet on the set type of device, which is collected by a magnetic field sensor of the mobile terminal, is greater than or equal to a set magnetic field intensity value, where a position where the magnetic field sensor is disposed in the mobile terminal is on a same side as a position where the camera is disposed in the mobile terminal.

Figure 5:
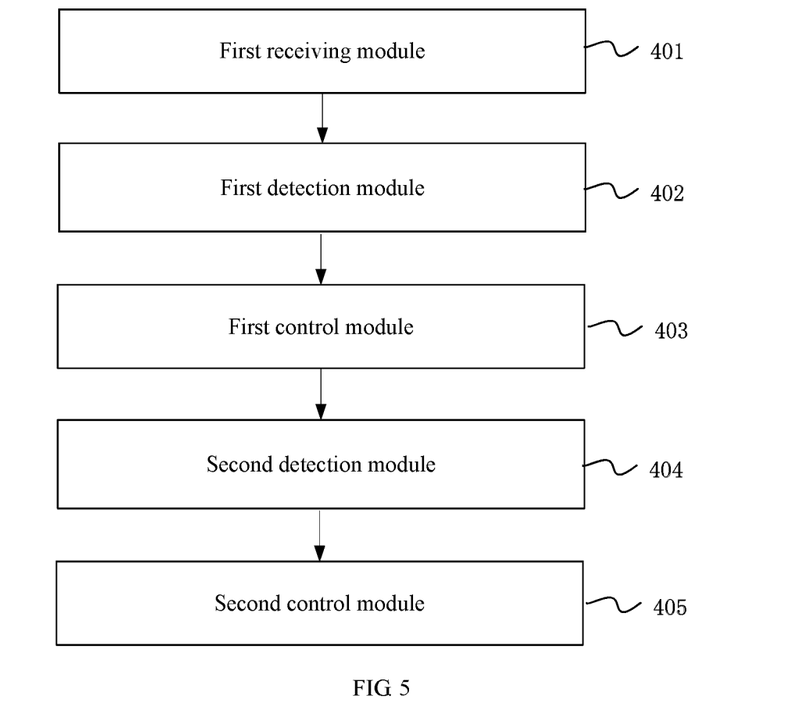
FIG. 5 is a structural diagram showing a device for controlling a retractable camera according to an exemplary embodiment.

The embodiments of the present disclosure provide a device for controlling a retractable camera. Referring to FIG. 5 which is a structural diagram showing a device for controlling a retractable camera according to an exemplary embodiment. As shown in FIG. 5, in addition to the device shown in FIG. 4, the device further includes a second detection module 404 and a second control module 405.

The second detection module 404 is configured to detect whether the mobile terminal meets the condition indicating that the camera has a risk of damage when being ejected after the instruction for ejecting the camera is disabled. The second control module 405 is configured to execute the instruction for ejecting the camera when the mobile terminal does not meet the condition indicating that the camera has a risk of damage when being ejected.

The embodiments of the present disclosure provide a device for controlling a retractable camera. In addition to the device shown in FIG. 4, the device further includes a second detection module 404, a first display module, a first receiving module and a third control module.

The second detection module 404 is configured to detect whether the mobile terminal meets the condition indicating that the camera has a risk of damage when being ejected after the instruction for ejecting the camera is disabled. The first display module is configured to display a confirmation control when the mobile terminal does not meet the condition indicating that the camera has a risk of damage when being ejected, the confirmation control is used to confirm to execute the instruction for ejecting the camera. The first receiving module is configured to receive a confirmation signal for the confirmation control. The third control module is configured to execute the instruction for ejecting the camera after the confirmation signal for the confirmation control is received.

The embodiments of the present disclosure provide a device for controlling a retractable camera. The device includes the device shown in FIG. 4, and the first control module 401 can include a second display module that is configured to display a first selection control and a second selection control when the mobile terminal meets the condition indicating that the camera has a risk of damage when being ejected, where the first selection control corresponds to disabling the instruction for ejecting the camera, and the second selection control is used for enabling the instruction for ejecting the camera. The first control module can further include a second receiving module that is configured to receive a touch click signal for the first selection control, and a fourth control module that is configured to disable the instruction for ejecting the camera after the touch click signal for the first selection control is received.

The embodiments of the present disclosure further provide a device for controlling a retractable camera, including: a processor; and a memory for storing executable instructions for the processor, where the processor is configured to execute the executable instructions in the memory to implement the steps of the method described above.

The embodiments of the present disclosure further provide a non-transitory computer-readable storage medium having executable instructions stored thereon, and when the executable instructions are executed by a processor, the steps of the method described above are implemented.

Figure 6:
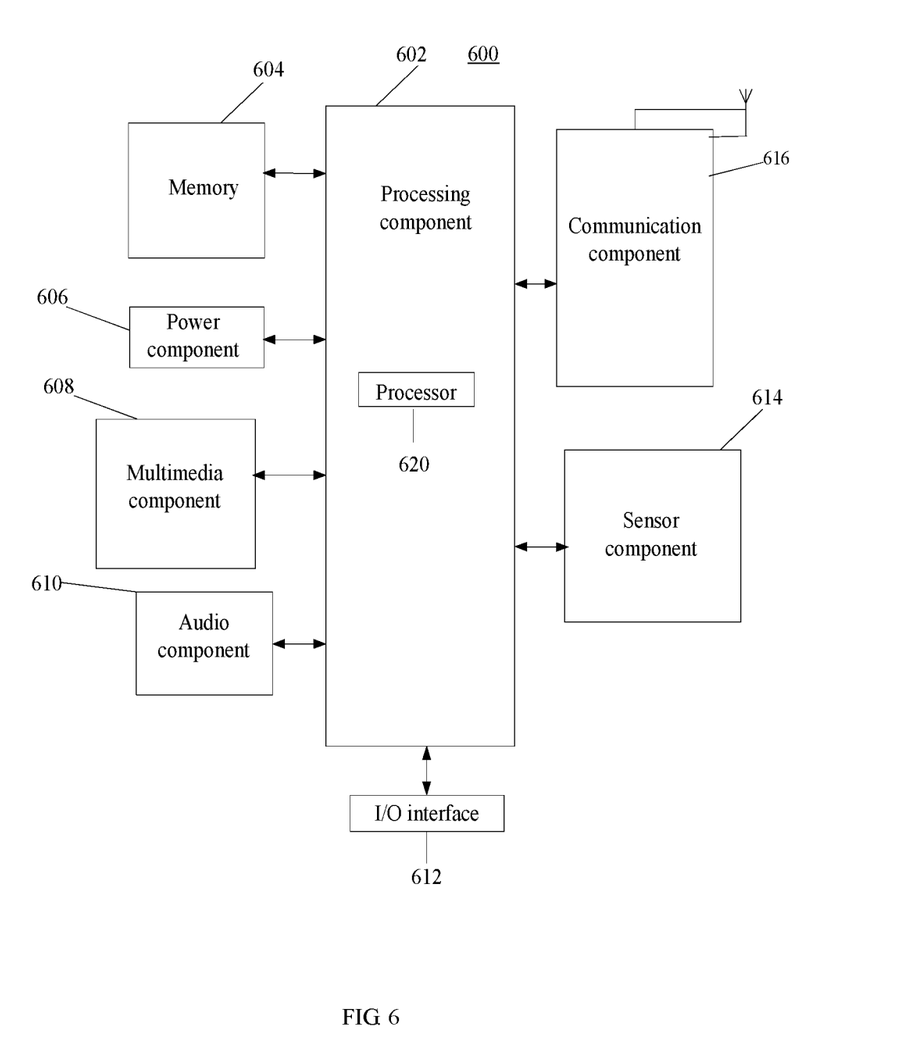
FIG. 6 is a structural diagram showing a device for controlling a retractable camera according to an exemplary embodiment.

FIG. 6 is a block diagram showing a device 600 for controlling a retractable camera according to an exemplary embodiment. For example, the device 600 may be a mobile phone, a computer, a digital broadcasting terminal, a messaging device, a game console, a tablet device, a medical device, a fitness device, a personal digital assistant, and so on.

Referring to FIG. 6, the device 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls the overall operations of the device 600, such as the operations associated with display, telephone calls, data communications, camera operations, and recording operations. The processing component 602 can include one or more processors 620 to execute instructions to perform all or part of the steps in the above described methods. Moreover, the processing component 602 can include one or more modules to facilitate the interaction between the processing component 602 and other components. For example, the processing component 602 can include a multimedia module to facilitate the interaction between the multimedia component 608 and the processing component 602.

The memory 604 is configured to store various types of data to support the operation of the device 600. Examples of such data include instructions for any application or method operated on device 600, such as the contact data, the phone book data, messages, pictures, videos, and the like. The memory 604 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the device 600. The power component 606 can include a power management system, one or more power sources, and other components associated with the generation, management, and distribution of power in the device 600.

The multimedia component 608 includes a screen providing an output interface between the device 600 and the user t. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. When the device 600 is in an operation mode, such as a photographing mode or a video mode, the front camera and/or the rear camera can receive external multimedia datum. Each of the front camera and the rear camera may be a fixed optical lens system or have focus and optical zoom capability.

The audio component 610 is configured to output and/or input an audio signal. For example, the audio component 610 includes a microphone (MIC) configured to receive an external audio signal when the device 600 is in an operation mode, such as a call mode, a recording mode, and a voice recognition mode. The received audio signal may be further stored in the memory 604 or sent via the communication component 616. In some embodiments, the audio component 610 also includes a speaker for outputting the audio signal.

The I/O interface 612 provides an interface between the processing component 602 and peripheral interface modules, such as a keyboard, a click wheel, buttons, and the like. These buttons may include, but are not limited to, a home button, a volume button, a starting button, and a locking button.

The sensor component 614 includes one or more sensors for providing status assessments of various aspects of the device 600. For example, the sensor component 614 can detect an open/closed status of the device 600, relative positioning of components, such as the display and the keypad of the device 600. The sensor component 614 can also detect a change in position of one component of the device 600 or the device 600, the presence or absence of user contact with the device 600, an orientation, or an acceleration/deceleration of the device 600, and a change in temperature of the device 600. The sensor component 614 can include a proximity sensor configured to detect the presence of nearby objects without any physical contact. The sensor component 614 can also include a light sensor, such as a CMOS or CCD image sensor, configured to use in imaging applications. In some embodiments, the sensor component 614 can also include an accelerometer sensor, a gyroscope sensor, a magnetic sensor, a pressure sensor, or a temperature sensor.

The communication component 616 is configured to facilitate wired or wireless communication between the device 600 and other devices. The device 600 can access a wireless network based on any communication standard, such as WiFi, 2G 3G 4G, or 5G or a combination thereof. In an exemplary embodiment, the communication component 616 receives broadcast signals or broadcast associated information from an external broadcast management system via a broadcast channel. In an exemplary embodiment, the communication component 616 also includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In an exemplary embodiment, the device 600 may be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor, or other electronic components.

In an exemplary embodiment, there is also provided a non-transitory computer-readable storage medium including instructions, such as a memory 604 including instructions executable by the processor 620 of the device 600 to perform the above described method. For example, the non-transitory computer readable storage medium may be a ROM, a random access memory (RAM), a CD-ROM, a magnetic tape, a floppy disc, and an optical data storage device.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. A method for controlling a retractable camera that is applied to a mobile terminal, the method comprising:
   receiving an instruction for ejecting the retractable camera;
   detecting whether the mobile terminal meets a condition indicating that the camera has a risk of damage when being ejected; and
   disabling the instruction for ejecting the retractable camera when the mobile terminal meets the condition indicating that the camera has a risk of damage when being ejected;
   wherein disabling the instruction for ejecting the retractable camera when the mobile terminal meets the condition indicating that the camera has a risk of damage when being ejected further comprises:
   displaying a first selection control and a second selection control when the mobile terminal meets the condition indicating that the camera has a risk of damage when being ejected, wherein the first selection control is used for disabling the instruction for ejecting the camera and the second selection control is used for allowing to execute the instruction for ejecting the camera; and
   disabling the instruction for ejecting the camera after receiving a touch click signal for the first selection control.

2. The method according to claim 1, wherein the mobile terminal meets the condition indicating that the camera has a risk of damage when being ejected in at least one of the following situations:
   a motion characteristic speed collected by an inertial sensor in the mobile terminal is greater than or equal to a set speed value;
   a light intensity value collected by a light sensor in the mobile terminal is less than or equal to a set light intensity value;
   a set type of device is connected to the mobile terminal through a set short-range wireless communication mode, during operation of the device, the device is clamped to the mobile terminal at a position so that the retractable camera is blocked from being ejected; and
   a magnetic field intensity value between the mobile terminal and a magnet on the set type of device collected by a magnetic field sensor of the mobile terminal is greater than or equal to a set magnetic field intensity value, wherein a position where the magnetic field sensor is disposed in the mobile terminal is on a same side as a position where the camera is disposed in the mobile terminal.

3. The method according to claim 1, further comprising, after disabling the instruction for ejecting the camera, detecting whether the mobile terminal meets the condition indicating that the camera has a risk of damage when being ejected, and executing the instruction for ejecting the camera when the mobile terminal does not meet the condition indicating that the camera has a risk of damage when being ejected.

4. The method according to claim 1, further comprising, after disabling the instruction for ejecting the camera, detecting whether the mobile terminal meets the condition indicating that the camera has a risk of damage when being ejected, and displaying a confirmation control for confirming to execute the instruction for ejecting the camera and executing the instruction for ejecting the camera after receiving a confirmation signal for the confirmation control in response to determining that the mobile terminal does not meet the condition indicating that the camera has a risk of damage when being ejected.

5. A device for controlling a retractable camera, comprising:
a processor; and
a memory for storing executable instructions for the processor,
wherein the processor is configured to execute the executable instructions in the memory to implement the method according to claim 1.

6. A device for controlling a retractable camera, comprising:
a processor; and
a memory for storing executable instructions for the processor,
wherein the processor is configured to execute the executable instructions in the memory to implement the method according to claim 2.

7. A device for controlling a retractable camera, comprising:
a processor; and
a memory for storing executable instructions for the processor,
wherein the processor is configured to execute the executable instructions in the memory to implement the method according to claim 3.

8. A device for controlling a retractable camera, comprising:
a processor; and
a memory for storing executable instructions for the processor,
wherein the processor is configured to execute the executable instructions in the memory to implement the method according to claim 4.

9. A device for controlling a retractable camera that is applied to a mobile terminal and includes a processor and a storage device for storing computer executable instructions that, when executed by the processor, cause the processor to:
receive an instruction for ejecting the retractable camera;
detect whether the mobile terminal meets a condition indicating that the camera has a risk of damage when being ejected; and
disable the instruction for ejecting the retractable camera when the mobile terminal meets the condition indicating that the camera has a risk of damage when being ejected;
wherein the processor is further configured to:
display a first selection control and a second selection control when the mobile terminal meets the condition indicating that the camera has a risk of damage when being ejected, wherein the first selection control is used for disabling the instruction for ejecting the camera and the second selection control is used for allowing to execute the instruction for ejecting the camera;
receive a touch click signal for the first selection control; and
disable the instruction for ejecting the camera after the touch click signal for the first selection control is received.

10. The device according to claim 9, wherein the mobile terminal meets the condition indicating that the camera has a risk of damage when being ejected in at least one of the following situations:
a motion characteristic speed collected by an inertial sensor in the mobile terminal is greater than or equal to a set speed value;
a light intensity value collected by a light sensor in the mobile terminal is less than or equal to a set light intensity value;
a set type of device is connected to the mobile terminal through a set short-range wireless communication mode, during operation of the device, the device is clamped to the mobile terminal at a position so that the retractable camera is blocked to be ejected; and
a magnetic field intensity value between the mobile terminal and a magnet on the set type of device collected by a magnetic field sensor of the mobile terminal is greater than or equal to a set magnetic field intensity value, wherein a position where the magnetic field sensor is disposed in the mobile terminal is on a same side as a position where the camera is disposed in the mobile terminal.

11. The device according to claim 9, wherein the processor is further configured to:
detect whether the mobile terminal meets the condition indicating that the camera has a risk of damage when being ejected after the instruction for ejecting the camera is disabled; and
execute the instruction for ejecting the camera when the mobile terminal does not meet the condition indicating that the camera has a risk of damage when being ejected.

12. The device according to claim 9, wherein the processor is further configured to:
detect whether the mobile terminal meets the condition indicating that the camera has a risk of damage when being ejected after the instruction for ejecting the camera is disabled;
display a confirmation control for confirming to execute the instruction for ejecting the camera when the mobile terminal does not meet the condition indicating that the camera has a risk of damage when being ejected;
receive a confirmation signal for the confirmation control; and
execute the instruction for ejecting the camera after the confirmation signal for the confirmation control is received.

13. A non-transitory computer-readable storage medium having executable instructions stored thereon that, when executed by a processor, cause the processor to implement the method for controlling a retractable camera, the method comprising:
receiving an instruction for ejecting the retractable camera;
detecting whether the mobile terminal meets a condition indicating that the camera has a risk of damage when being ejected; and
disabling the instruction for ejecting the retractable camera when the mobile terminal meets the condition indicating that the camera has a risk of damage when being ejected;
wherein disabling the instruction for ejecting the retractable camera when the mobile terminal meets the condition indicating that the camera has a risk of damage when being ejected further comprise:
displaying a first selection control and a second selection control when the mobile terminal meets the condition indicating that the camera has a risk of damage when being ejected, wherein the first selection control is used for disabling the instruction for ejecting the camera and the second selection control is used for allowing to execute the instruction for ejecting the camera; and disabling the instruction for ejecting the camera after receiving a touch click signal for the first selection control.

14. The non-transitory computer-readable storage medium according to claim 13, wherein the mobile terminal meets the condition indicating that the camera has a risk of damage when being ejected in at least one of the following situations:
- a motion characteristic speed collected by an inertial sensor in the mobile terminal is greater than or equal to a set speed value;
- a light intensity value collected by a light sensor in the mobile terminal is less than or equal to a set light intensity value;
- a set type of device is connected to the mobile terminal through a set short-range wireless communication mode, during operation of the device, the device is clamped to the mobile terminal at a position so that the retractable camera is blocked to be ejected; and
- a magnetic field intensity value between the mobile terminal and a magnet on the set type of device collected by a magnetic field sensor of the mobile terminal is greater than or equal to a set magnetic field intensity value, wherein a position where the magnetic field sensor is disposed in the mobile terminal is on a same side as a position where the camera is disposed in the mobile terminal.

15. The non-transitory computer-readable storage medium according to claim 13, wherein the method further comprises, after disabling the instruction for ejecting the camera, detecting whether the mobile terminal meets the condition indicating that the camera has a risk of damage when being ejected, and executing the instruction for ejecting the camera in response to determining that the mobile terminal does not meet the condition indicating that the camera has a risk of damage when being ejected.

16. The non-transitory computer-readable storage medium according to claim 13, wherein the method further comprises, after disabling the instruction for ejecting the camera, detecting whether the mobile terminal meets the condition indicating that the camera has a risk of damage when being ejected, and displaying a confirmation control for confirming to execute the instruction for ejecting the camera and executing the instruction for ejecting the camera after receiving a confirmation signal for the confirmation control in response to determining that the mobile terminal does not meet the condition indicating that the camera has a risk of damage when being ejected.

* * * * *